(12) United States Patent
Green et al.

(10) Patent No.: US 7,340,953 B2
(45) Date of Patent: Mar. 11, 2008

(54) LIQUID MEASURING VESSEL

(75) Inventors: David Green, Toronto (CA); David Chan, Scarborough (CA)

(73) Assignee: Browne & Co., Markham (CA)

( * ) Notice: Subject to any disclaimer, the term of this patent is extended or adjusted under 35 U.S.C. 154(b) by 0 days.

(21) Appl. No.: 11/717,679

(22) Filed: Mar. 14, 2007

(65) Prior Publication Data
US 2007/0227245 A1     Oct. 4, 2007

Related U.S. Application Data

(60) Provisional application No. 60/782,284, filed on Mar. 15, 2006.

(51) Int. Cl.
*G01F 19/00* (2006.01)
*G01F 23/72* (2006.01)

(52) U.S. Cl. ............................ 73/428; 73/305

(58) Field of Classification Search ............. 73/290 R, 73/305, 309, 323, 426, 427, 428
See application file for complete search history.

(56) References Cited

U.S. PATENT DOCUMENTS

| | | | |
|---|---|---|---|
| 153,159 A | 7/1874 | Dinwiddie | |
| 216,530 A | 6/1879 | Pfitzenmeier | |
| 291,296 A * | 1/1884 | Colby | 73/334 |
| 423,018 A | 3/1890 | Young | |
| 1,507,968 A | 9/1924 | Johnson | |
| 1,564,470 A | 12/1925 | Crimmel | |
| 1,722,101 A | 1/1929 | Little | |
| 1,812,676 A * | 6/1931 | Beall | 73/322 |
| 2,165,045 A | 7/1939 | Garside | |
| 2,801,541 A * | 8/1957 | Moreland | 73/319 |
| 3,672,061 A * | 6/1972 | Alessi | 33/833 |
| 4,550,602 A * | 11/1985 | Burke et al. | 73/428 |
| 5,233,870 A * | 8/1993 | Peroni | 73/323 |
| 5,397,036 A | 3/1995 | Maiwald | |
| 6,263,732 B1 | 7/2001 | Hoeting et al. | |
| 6,375,031 B1 * | 4/2002 | Kwan | 220/663 |
| 6,543,284 B2 | 4/2003 | Hoeting et al. | |

* cited by examiner

*Primary Examiner*—Hezron Williams
*Assistant Examiner*—John Fitzgerald
(74) *Attorney, Agent, or Firm*—Gowling Lafleur Henderson LLP

(57) ABSTRACT

The present invention relates to a liquid measuring vessel having a removable volume indicating clip.

14 Claims, 6 Drawing Sheets

LIQUID MEASURING VESSEL

FIELD OF THE INVENTION

The present invention relates to a liquid measuring vessel and further relates to a liquid measuring vessel with a removable volume indicating clip.

BACKGROUND OF THE INVENTION

Measuring vessels, generally referred to as measuring spoons, cups and/or jugs, are frequently used in the culinary field. Ingredients for recipes, and in particular for baking, usually need to be accurately measured and therefore a measuring vessel is usually used.

Generally these vessels will have indicia either on the sides or on an internal surface to indicate the volume measurements. When measuring ingredients in these vessels it is important to ensure that the ingredients are leveled out, i.e. that the vessel is held stationary at a flat level, so that an accurate reading can be made. In the instance when the markings are found on the inside of the vessel the user generally must peer into the measuring vessel in order to assess whether the accurate amount of ingredient has been obtained. In the embodiments where the indicia are located on the outside of the measuring vessel, and the vessel is made from a material through which the ingredient can be viewed, the user will either have to bring the vessel up to eye level to assess the amount of ingredient within the vessel or will have to bend down to view the measurement. Both of these methods for obtaining accurate measurements may be cumbersome and/or awkward for the user.

SUMMARY OF THE INVENTION

The present invention provides a liquid measuring vessel with a removable volume indicating clip that allows a user to set the measurement required from the outside of the vessel which simultaneously provides an easy indication within the vessel of the level to which the vessel should be filled.

In one embodiment the present invention provides a liquid measuring vessel comprising a base and an encircling wall defining a cavity having an upper open end for receiving contents having a measurable volume. A removable clip is operable to be received on at least a portion of the wall and the clip comprises first and second markers operable to simultaneously move along the clip. The first marker is positioned so that it is located on the outer surface of the vessel when the clip is placed on the vessel and the second marker is positioned so that it is located on the inside surface of the vessel when the clip is received on the vessel. At least one of the clip or the portion of the wall to which the clip is attached includes indicia for providing a measurement of the volume of contents received in the vessel.

In an alternative aspect the present invention provides for the use the liquid measuring vessel described herein comprising the steps of (i) moving the marker located on the external surface of the vessel adjacent the indicia representing the quantity of ingredient required and (ii) filling the vessel with the ingredient up to the level of the marker located inside the vessel.

BRIEF DESCRIPTION OF THE DRAWINGS

The present invention will now be better understood with reference to the description and to the accompanying drawings in which.

DETAILED DESCRIPTION OF THE PREFERRED EMBODIMENTS

The present invention provides a liquid measuring vessel having a removable volume indicating clip. The liquid measuring vessel of the present invention will now be described in further detail with reference to FIGS. 1 through 6 in which the liquid measuring vessel is indicated generally at numeral 10.

Figure 1:
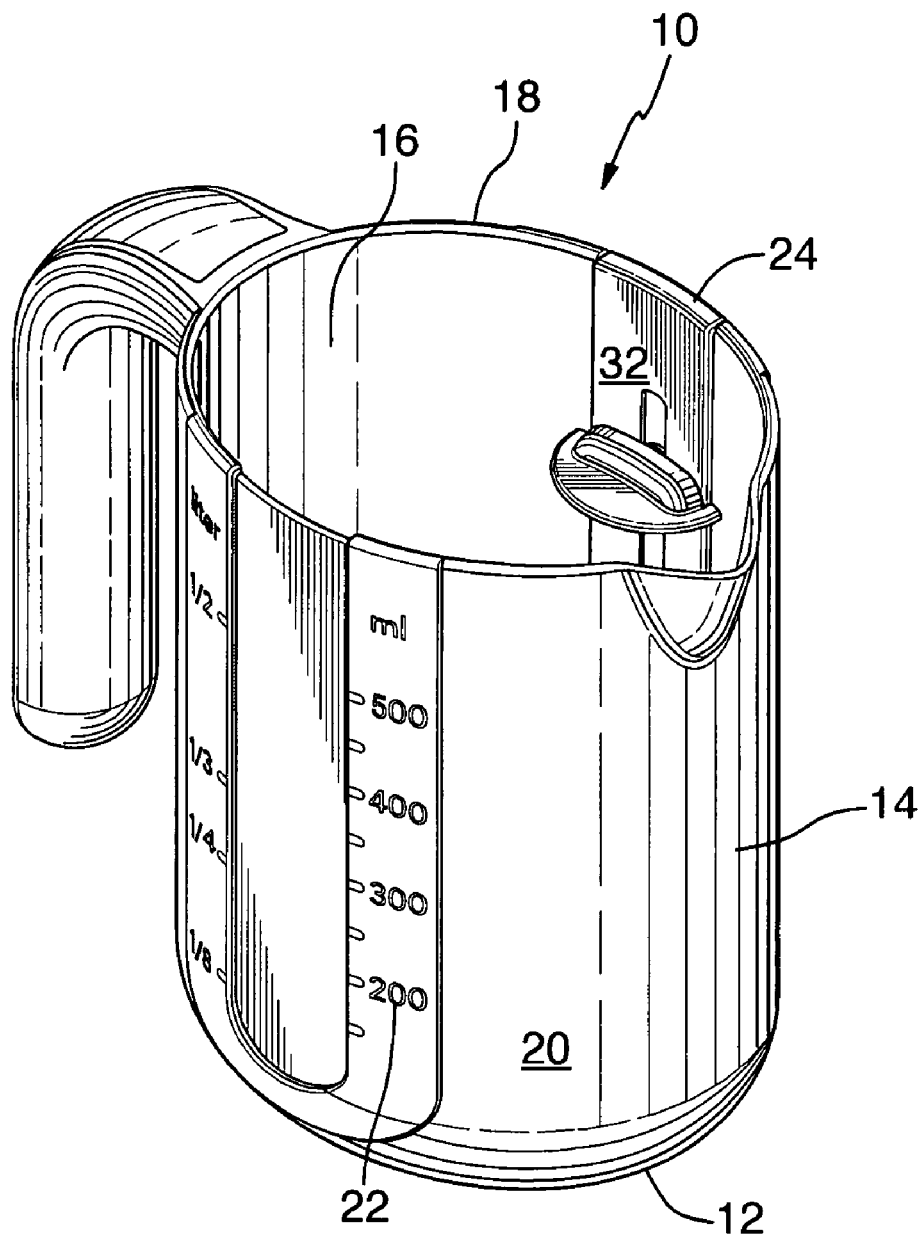
FIG. 1 is an isometric view of an embodiment of the liquid measuring vessel of the present invention.

In the embodiment illustrated in FIG. 1, liquid measuring vessel 10 includes a base portion 12 and an encircling wall 14 that defines a cavity 16 having an upper open end 18 for receiving contents, for example liquids, having a measurable volume. As can be seen, in this embodiment liquid measuring vessel 10 is a measuring jug however, it will be understood that the liquid measuring vessel may take any form that includes a confined cavity into which contents may be placed for measuring, for example the liquid measuring vessel 10 may be a measuring cup.

The liquid measuring vessel 10 is preferably made from a high viscosity polycarbonate. However, it will be understood that other materials may be used to form the liquid measuring vessel, including but not limited to any suitable food grade plastic, e.g. nylon or ABS, or pyrex® The liquid measuring vessel illustrated is a 2 cup liquid measuring vessel. However, it will be understood that the present invention is not limited to 2 cup liquid measuring vessels but can be adapted to measure varying maximum quantities of ingredient(s).

Figure 2:
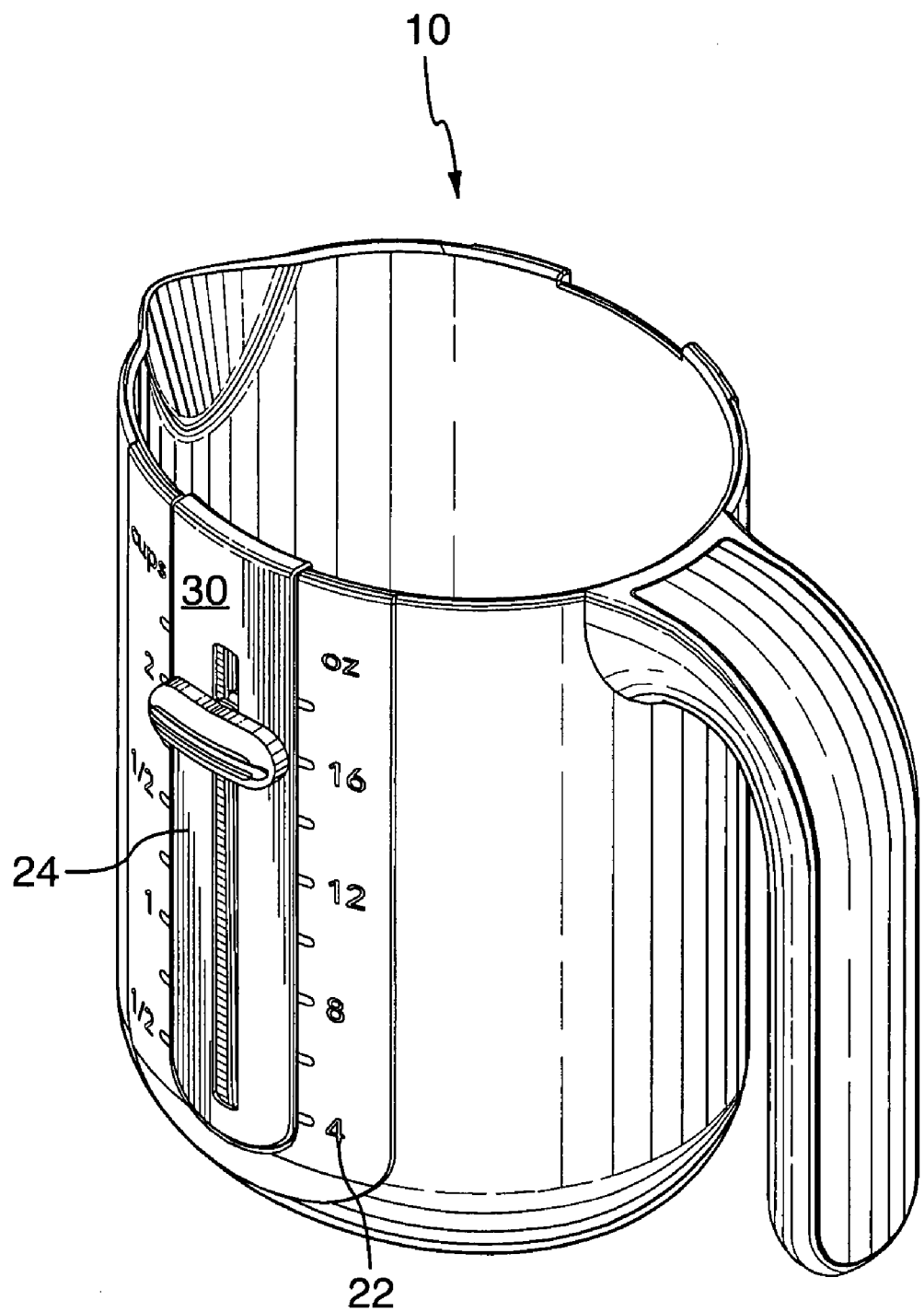
FIG. 2 is an isometric view of the opposite side of the liquid measuring vessel of FIG. 1.
Figure 3:
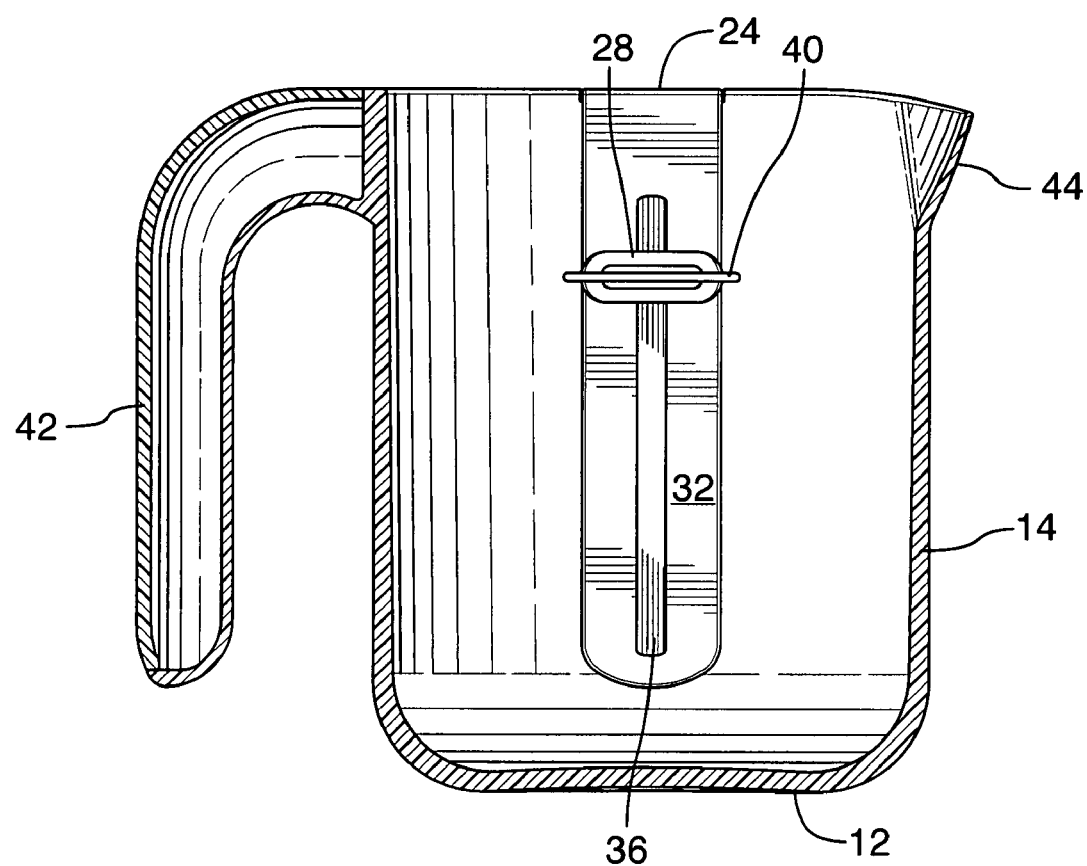
FIG. 3 is a cross sectional view of the liquid measuring vessel of FIG. 1.

Located on at least a portion of the outer surface 20 of the wall 14 are indicia 22. The indicia 22 represent volumetric unit measurements. As can be seen in the embodiment of FIGS. 1 and 2 the indicia 22 are located on two sections of the outer surface of the wall 14. The measurements may be provided in either metric or imperial units, or both, and will be spaced along the outer surface 20 at a position that represents the particular unit measurement. It will be understood by a person skilled in the art that the indicia may be listed in one line/column or may be in two or more lines/columns. For example, FIGS. 1 and 2 show the indicia located on opposite sides of the liquid measuring vessel in two columns on each side. Within each column the indicia may be staggered or may be aligned.

The liquid measuring vessel 10 further includes a removable clip 24 that is slidingly received on at least a portion of the wall 14 adjacent the indicia 22. In the embodiment shown in FIGS. 1 through 6 the removable clip 24 may be attached to either portion of the wall 14 that include indicia 22 depending on which measurement is required and on which side that measurement is indicated. The removable clip 24 includes an external wall 30, indicated clearly in FIGS. 4-6, and an internal wall 32 that define a channel 34 between them. In order to attach the removable clip 24 to the wall 14 of the liquid measuring vessel 10 the removable clip 24 is mounted on the wall 14 so that the wall 14 is received within the channel 34 of the removable clip 24. By this placement the external surface 30 is located on the outside of the liquid measuring vessel 10 and the internal surface 32 is located inside the liquid measuring vessel 10.

As can be seen in the Figures, the wall 14 of the illustrated embodiment is thinner in the area between the indicia 22. In this embodiment, the thinner wall is sized to receive the removable clip 24 thereon. However, it will be understood that a change in the wall thickness is not required provided that the removable clip is sized to be received on the wall at a location proximal the indicia. It will be further understood that the change in the thickness of the wall in the illustrated embodiment assists in maintaining the removable clip in its position and may prevent the clip from moving along the wall.

The removable clip 24 includes a pair of markers 26, 28 each connected to opposing sides of the clip 24. The pair of markers 26, 28 are connected to the clip 24 in order that they are able to simultaneously move along the clip 24 adjacent to and aligned with the indicia 22. As can be seen in FIG. 2, marker 26 is attached to the external surface 30 of the removable clip 24 and, as can be seen in FIG. 1, marker 28 is attached to the internal surface 32 of the removable clip 24. The markers 26, 28 are located on the removable clip 24 within slots 36 located on each surface 30, 32 so that the markers 26, 28 are operable to move up and down the slots 36. The markers 26, 28 may be placed on the removable clip 24 using a snap fit connection. Further, each marker 26, 28 may be formed from two separate pieces that are connected through the slot 36 and snap fit together and optionally glued to prevent the marker from separating during use. The slots 36 extend along the removable clip for at least the length of the indicia 22 located on the liquid measuring vessel 10 so that the markers 26, 28 can move up and down the slots 36 within the range of the indicia 22. The connection of the markers 26, 28 to the internal and external surfaces 32, 30 of the removable clip 24 may be by any means provided that the connection allows for the marker to move within the slot 36 and therefore within the range of the indicia 22 located on the wall 14 of the liquid measuring vessel 10.

Figure 4:
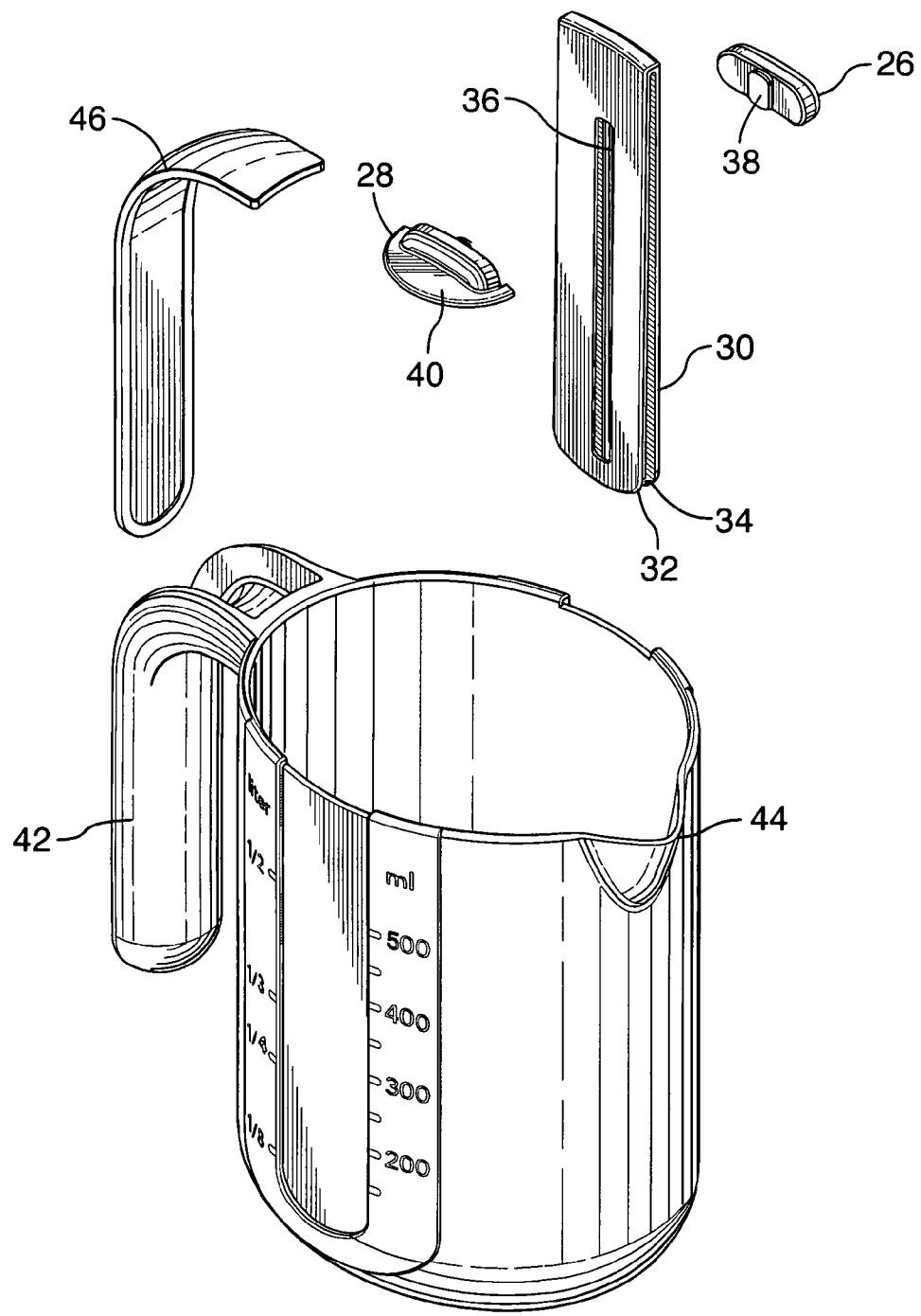
FIG. 4 is an exploded isometric view of the liquid measuring vessel of FIG. 1.
Figure 5:
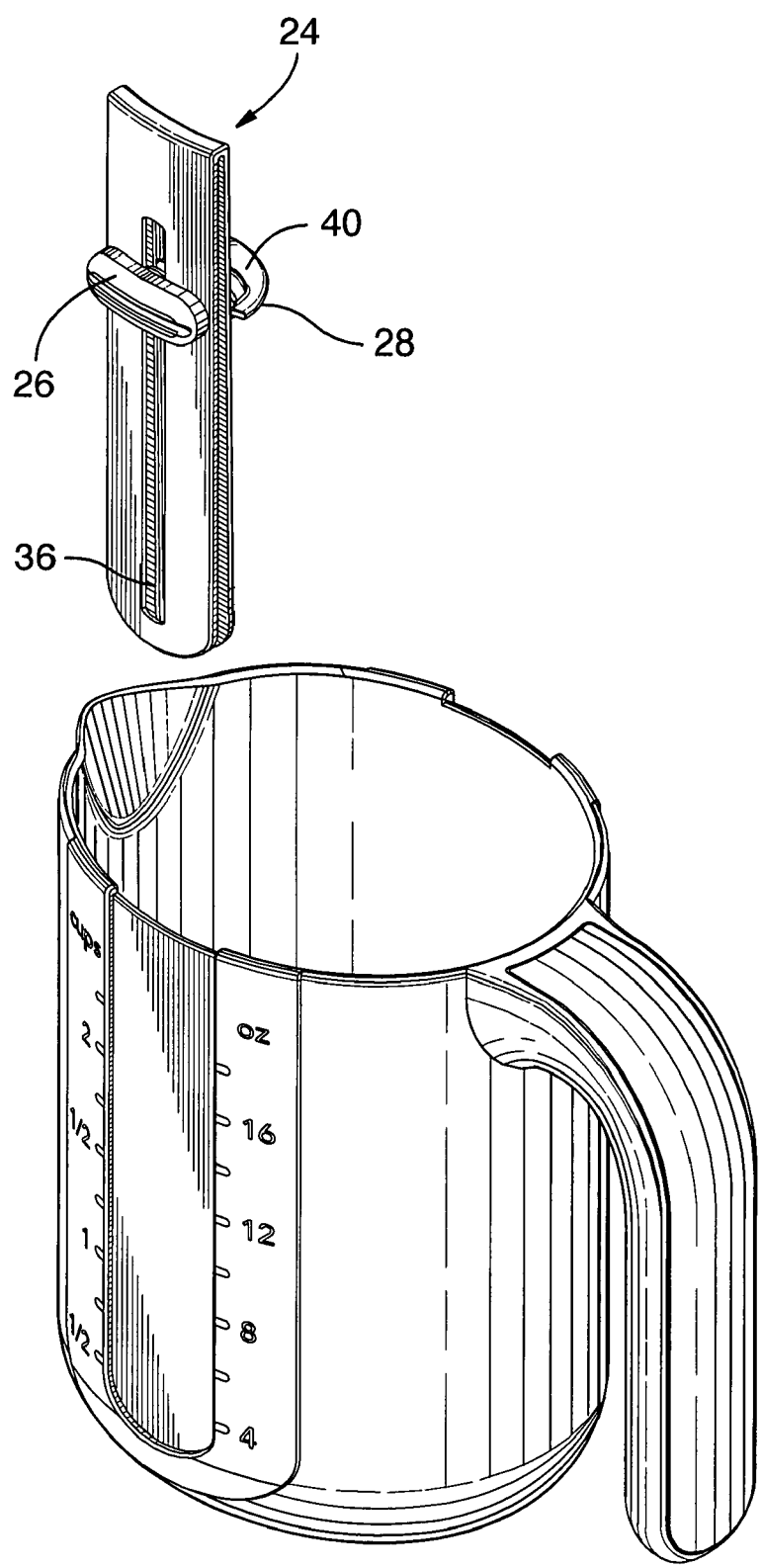
FIG. 5 is an isometric view of the liquid measuring vessel of FIG. 2, shown from above, showing the removable clip prior to placement on the vessel wall.
Figure 6:
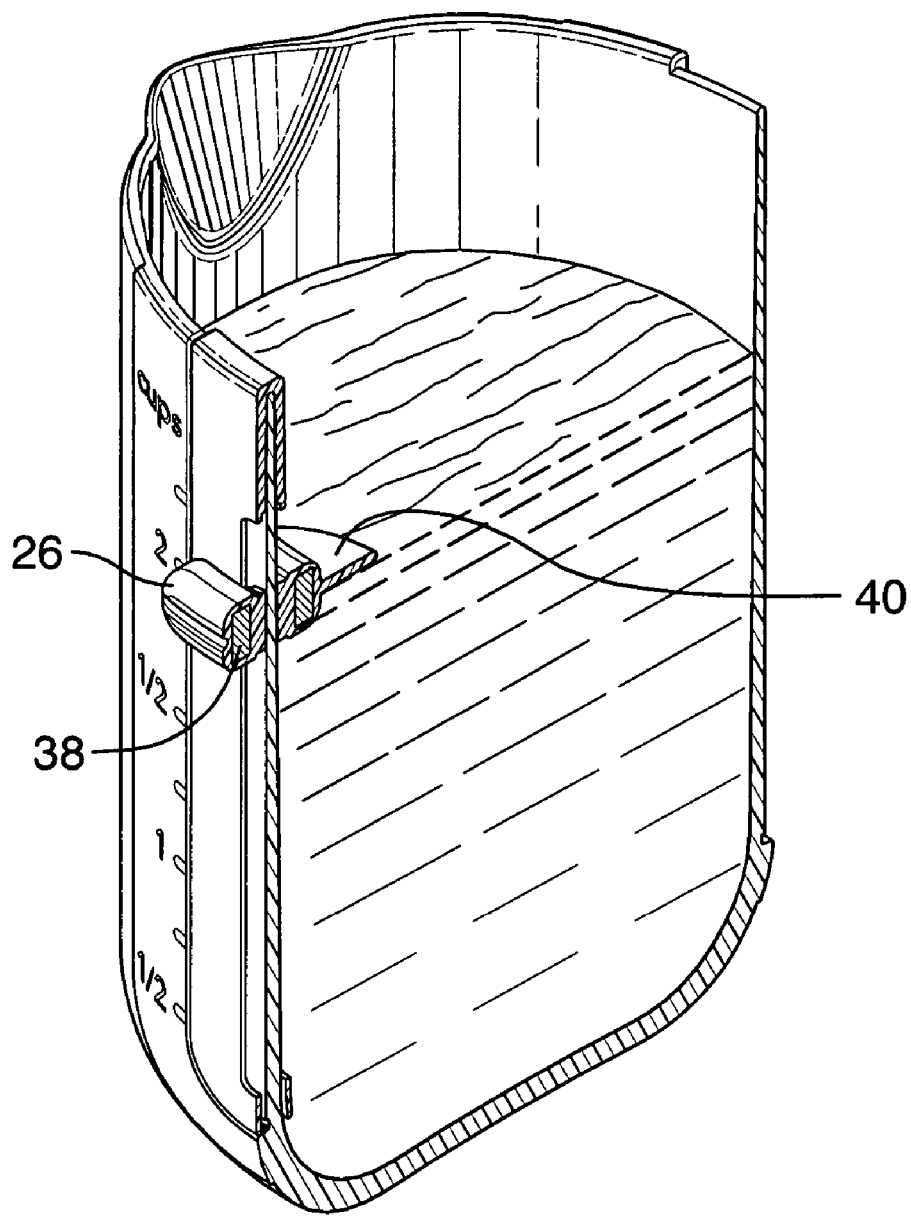
FIG. 6 is a cross sectional view of the liquid measuring vessel of the present invention showing a cross section of the removable clip.

As can be seen in FIGS. 4 and 6, the pair of markers 26, 28 each include magnetic portions, i.e. magnets 38 located on the surfaces that face inwardly towards the adjacent marker or within each marker adjacent the portion that faces inwardly towards the opposing marker. The magnets 38 attract each other and through this attraction couple the markers 26, 28 to each other in a manner that means that the movement of one marker initiates the movement of the second. For example, if marker 26 is moved along the clip 24, the magnetic attraction of its magnet to the magnet in marker 28 will cause marker 28 to move. In an alternative embodiment one of the markers 26, 28 may include a magnet and the other marker 26, 28 may be made from a suitable material that will respond to the magnetic field and therefore will act in the same manner as the two magnet system discussed above.

FIG. 6 shows a cross sectional view taken down the middle of the removable clip 24 showing the connection of markers 26, 28 through the magnets 38 when the removable clip 24 is attached to the liquid measuring vessel 10. It will be understood that the magnet may be attached to the marker by any means known, for example the magnet may be adhered, i.e. glued, in place or may be encapsulated within the structure of the marker. The inclusion of the magnet in the marker must be sufficient to allow sufficient magnetic attraction between the two markers.

The removable clip 24 is preferably made from plastic, for example, but not limited to, polypropylene copolymer. However, it will be understood that other materials may be used to manufacture the clip, such materials will be well known to a person skilled in the art.

In order to allow for an easy assessment of the level of the ingredient within the liquid measuring vessel 10, the marker 28 located on the inside of the liquid measuring vessel 10 includes a lip portion or projection 40. The lip portion 40 extends horizontally into the liquid measuring vessel generally parallel with the base portion 12 of the liquid measuring vessel 10. This provides an easy reference for a user to assess whether the level of the ingredients placed in the vessel 10 have reached the desired quantity.

The liquid measuring vessel 10 of the present embodiment also includes a handle 42 and a spout 44 through which ingredient(s) may be poured out of the liquid measuring vessel 10. The handle 42 includes a handle grip portion 46 that is attached to the handle 42 along the underside. The handle grip portion 46 is connected to the handle 42 via a snap fit. However, it will be understood that the handle grip portion 46 may be over-moulded on the handle 42 or may be attached to the handle 42 by other means known in the art. The handle grip portion 46 may be made from any material however, it is preferably made from thermoplastic rubber to provide an easier gripping non-slip surface for a user.

In an alternative embodiment of the liquid measuring vessel described herein the indicia 22 may be located on the removable clip 24 on the external surface 30. The indicia 22 may be positioned along either side or along both sides of slot 36. In this embodiment, the removable clip 24 may be received on any portion of the wall 14 of the measuring vessel. The wall 14 may include a recessed portion for receiving the removable clip 24, as discussed above.

In use, prior to ingredient(s) being placed within the liquid measuring vessel 10, a user may first decide which measurements are to be used, i.e. metric or imperial, and thereby decide which side of the liquid measuring vessel to place the removable clip 24. The user can then place the marker 26 located on the external surface 30 of the liquid measuring vessel 10 adjacent the indicia 22 that represents the amount of ingredient(s) required. The movement of the marker 26 will initiate the movement of marker 28, located inside the liquid measuring vessel 10, and the lip portion 40 on marker 28 will extend into the vessel to provide an easy indication of the level to which the ingredient(s) must reach. The user can then begin to place the ingredient(s) into the vessel until the level at which the lip portion 40 is located is reached, at which point the user knows that the required amount of ingredient(s) has been measured. FIG. 6 illustrates the position of the ingredient(s) being measured relative to the placement of the markers 26, 28 and in particular lip portion 40. The removable clip 24 may then be removed depending on the use of the ingredients. If the user wishes to heat, defrost or melt the ingredients, for example in the microwave, the clip 24 may be removed prior to this step.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

What is claimed is:

1. A liquid measuring vessel comprising:
    a base and an encircling wall defining a cavity having an upper open end for receiving contents having a measurable volume; and
    a removable clip operable to be received on at least a portion of the wall, the clip comprising first and second markers operable to simultaneously move along the clip, the first marker connected to the clip at a position operable to locate the first marker on the outer surface of the vessel when the clip is received on the wall of the vessel and the second marker connected to the clip at a position operable to locate the second marker on the inside surface of the vessel when the clip is received on the wall, at least one of the portion of the wall and the removable clip have indicia thereon for providing a measurement of the volume of contents received in the vessel.

2. The measuring vessel according to claim 1, wherein the first and second markers each comprise a magnet.

3. The measuring vessel according to claim 1, wherein one of the first and second markers is made of magnetic material and the other is made of material responsive to the magnetic material.

4. The measuring vessel according to claim 1, wherein the second marker includes a projection extending inwardly of the wall.

5. The measuring vessel according to claim 1, wherein the removable clip is slidingly received on at least a portion of the wall.

6. The measuring vessel according to claim 1, wherein the removable clip comprises an external surface and an internal surface defining a channel therebetween for receiving a portion of the wall therein.

7. The measuring vessel according to claim 1, further comprising a handle.

8. The measuring vessel according to claim 1, further comprising a spout.

9. The measuring vessel according to claim 1, wherein the clip further comprises a channel for receiving the first and second markers therein.

10. The measuring vessel according to claim 9, wherein the channel extends along the clip for at least the length of the indicia.

11. The measuring vessel according to claim 1, wherein the outer surface of the wall comprises two or more regions for receiving the clip thereon.

12. The measuring vessel according to claim 11, wherein the removable clip is operable to connect to any one of the regions.

13. A removable measuring clip for use on a liquid measuring vessel comprising first and second markers operable to simultaneously move along the clip, the first marker connected to the clip at a position operable to locate the first marker on the outer surface of the vessel when the clip is attached to the vessel and the second marker connected to the clip at a position operable to locate the second marker on the inside surface of the vessel when the clip is attached to the vessel.

14. The use of a liquid measuring vessel according to claim 1, comprising the steps of
    (i) placing the removable clip on the measuring vessel;
    (ii) moving the marker located on the external surface of the vessel adjacent the indicia representing the quantity of ingredient required; and
    (iii) filling the vessel with the ingredient up to the level of the marker located inside the vessel.

* * * * *